United States Patent [19]

Yoshimoto

[11] 4,253,133
[45] Feb. 24, 1981

[54] TRIMMER CAPACITOR

[75] Inventor: Akinori Yoshimoto, Morioka, Japan

[73] Assignee: Alps Electric Co., Ltd., Tokyo, Japan

[21] Appl. No.: 84,534

[22] Filed: Oct. 15, 1979

[30] Foreign Application Priority Data

Oct. 20, 1978 [JP] Japan .......................... 53-144227[U]

[51] Int. Cl.³ .............................................. H01G 5/24
[52] U.S. Cl. ..................................... 361/293; 361/292
[58] Field of Search ................................. 361/293, 292

[56] References Cited

U.S. PATENT DOCUMENTS

| 3,656,033 | 4/1972 | Niviles | 361/293 |
| 4,068,285 | 1/1978 | Yamada | 361/293 |

*Primary Examiner*—E. A. Goldberg
*Attorney, Agent, or Firm*—Guy W. Shoup; Gerard F. Dunne

[57] ABSTRACT

A disc trimmer capacitor has a rotor plate driven by a shaft, a dielectric layer and a stator. The shaft has a fan shaped flange with at least two protuberances to urge the rotor toward the dielectric layer.

3 Claims, 5 Drawing Figures

TRIMMER CAPACITOR

BACKGROUND OF THE INVENTION

This invention relates to the shape of the rotor shaft of a trimmer capacitor and specifically to the shape of the rotor shaft of a ceramic trimmer capacitor, and contemplates to provide a trimmer capacitor having stable electrostatic capacitance and improved reliability even during changes in the ambient opposed faces of the rotor electrode and a dielectric layer in known trimmer capacitors.

In the conventional ceramic trimmer capacitor as illustrated in FIGS. 1 and 2, a metallic rotor electrode (13) having an outer diameter of about 5 to 8 mm is brought into pressure contact with a dielectric layer (14) by means of a head (12), having a size of about 2 to 3 mm, of a rotor shaft (11). Hence, in fitting the rotor shaft (11) with mechanical impact such as by caulking, a warping or distortion tends to occur on the face of the metallic rotor electrode (13) if strong mechanical impact pressure is applied. If the mechanical impact strength is small, on the other hand, contact becomes insufficient between the rotor electrode (13) and the ceramic dielectric layer (14), thereby causing an air gap between their opposed faces.

The surface of the dielectric layer is generally subjected to a precision mirror finishing so as to have a surface roughness of not greater than 1μ by lapping. If unevenness exceeding 1μ is present on the surface, however, an air gap is formed and there may thus be a great fluctuation in the electrostatic capacitance, thereby degrading the ambient reliability characteristics of the capacitor with respect to temperature and humidity.

SUMMARY OF THE INVENTION

Accordingly, in order to solve the abovementioned problems, the present invention has a flange formed integrally with the head of the rotor shaft in order to press the rotor electrode and thus bring it into intimate contact with the dielectric layer.

Hereinafter, a preferred embodiment of the invention will be explained in further detail with reference to the accompanying drawings.

BRIEF DESCRIPTION OF THE DRAWINGS

FIGS. 1 and 2 illustrate an example of a conventional trimmer capacitor wherein FIG. 1 is a perspective view of the rotor shaft and the rotor electrode and FIg. 2 is a sectional side view of the principal portions; and FIGS. 3 through 5 illustrate the trimmer capacitor in accordance with the present invention wherein FIG. 3 is a perspective view of the rotor shaft (1) and the rotor electrode (4);

FIG. 4 is a side view of the rotor shaft (1); and

FIG. 5 is a sectional side view of the principal portions.

DESCRIPTION OF PREFERRED EMBODIMENT

Figure 1:
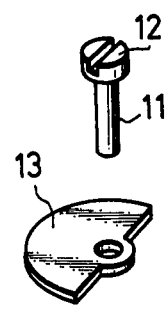
Figure 2:
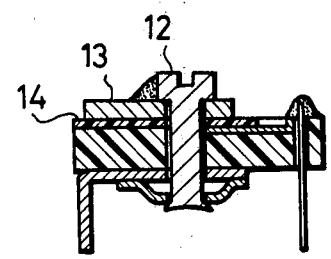
Figure 3:
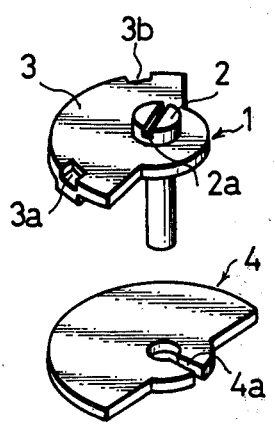
Figure 4:
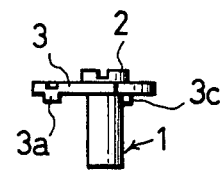
Figure 5:
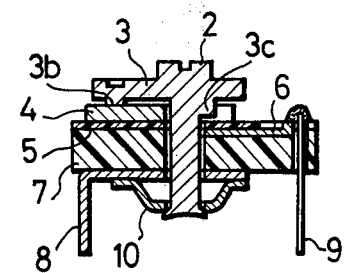

In the drawings, reference numeral 1 represents the rotor shaft prepared by header work, die-casting or the like, from a metal having high electric conductivity, and a slot (2a) for a screw driver is formed in the head (2) of the rotor shaft (1). A flange (3) having a substantially fan-shaped form is integrally formed with the head (2a), and two protuberances (3a), (3b) are formed on the outer circumference of the flange (3) with a suitable spacing between them. A non-slip protuberance (3c) is formed on the flange on the opposite side with respect to the head (2), and a slit portion (4a) is also provided in a rotor electrode (4) which is made of a good conductor such as copper. Reference numerals (5), (6) and (7) represents a dielectric layer, a stator electrode and an insulating substrate, respectively. Reference numeral (8) represents an extension terminal from the rotor electrode side while (9) represents an extension terminal from the stator electrode side. Reference numeral (10) represents a tension plate consisting of a thin metal plate having resiliency.

In the trimmer capacitor of the present invention, the rotor electrode (4) is arranged on the dielectric layer on the insulating substrate (7) with which the dielectric layer (5) and the stator electrode (6) are integrally formed. On the opposite side of the substrate, the extension terminal (8) of the rotor electrode side is disposed first and the tension plate (10) is then superposed thereon. Thereafter, the rotor shaft (1) is inserted from the rotor electrode side and the non-slip protuberance (3c) is aligned with the slit portion of the rotor electrode (4). The two protuberances (3a) and (3b) subsequently abut against the rotor electrode face. Assembly of the trimmer capacitor is then finished by caulking one end of the rotor shaft (1). Since the protuberances (3a), (3b) of the flange (3) continually press the rotor electrode (4), into contact with the dielectric it is possible to eliminate any air gap between the rotor electrode (4) and the dielectric layer (5).

The deviation of the maximum capacitance of the trimmer capacitor assembled in this manner falls within the range of ±1 PF with respect to a design target value of 23 PF, thereby enabling a drastic reduction in the number of defective products having insufficient capacitance. As to the ambient characteristics, the rate of change in capacitance between the initial value and the value after testing falls within the range of 2% in the trimmer capacitor of the present invention whereas it has been in the range of 3 to 6% in the conventional trimmer capacitor. Thus, the trimmer capacitor of the present invention exhibits extremely stable characteristics.

As described in the foregoing paragraph, in the trimmer capacitor of the present invention, the substantially fan-shaped flange is formed integrally with the rotor shaft and at least two protuberances are formed around the outer circumference of the flange with a suitable spacing between them so that they continually urge the rotor electrode into contact with the dielectric. This arrangement enables elimination of the air gap between the rotor electrode and the dielectric layer. Accordingly, the trimmer capacitor of the present invention has stable electrostatic capacitance and remarkably improved ambient reliability characteristics, enables easy assembly management and provides high quality products with a high level of production efficiency.

What is claimed is:

1. In a trimmer capacitor including: a dielectric layer formed on an insulating substrate; a stator electrode electrically connected to said dielectric layer; and a rotor electrode sliding on said dielectric layer and driven for rotation by a rotor shaft; the improvement wherein a substantially fan-shaped flange is formed integrally with said rotor shaft and has at least two protuberances formed on said flange so that said protuberances constantly urge the upper surface of said rotor electrode against said dielectric layer.

2. The trimmer capacitor as defined in claim 1 wherein said protuberances are arranged around the outer circumference of said flange.

3. The trimmer capacitor as defined in claim 1 wherein said flange includes a non-slip protuberance formed integrally therewith so as to mate with a slit portion formed in said rotor electrode.

* * * * *